Patented Dec. 26, 1950

2,535,994

UNITED STATES PATENT OFFICE 2,535,994

PROCESS OF PREPARING TRINUCLEAR CYANINE DYES CONTAINING A TERMINAL 5- AND 6-MEMBERED HETEROCYCLIC RING SYSTEM

Thomas R. Thompson, Binghamton, N. Y., assignor to General Aniline & Film Corporation, New York, N. Y., a corporation of Delaware No Drawing. Application December 21, 1948, Serial No. 66,576

4 Claims. (Cl. 260—240.1)

This invention relates to trinuclear cyanine dyes and particularly to an improved method of preparing the same.

Trinuclear cyanine dyes have been prepared by the method described in United States Patent 2,388,963. The method consists in first quaternizing a cyclammonium base containing a reactive thio group, and condensing it with a 3-ethylrhodanine to obtain the merocyanine intermediate. This procedure involves two steps and requires about four hours' time. The merocyanine intermediate is then fused with a mixture of a cyclammonium base and a quarternizing agent, such as methyl p-toluenesulfonate for 2½ to 3½ hours. After cooling the melt, pyridine is added and the mixture reheated under reflux for 20–30 minutes. The reaction mixture is then poured into an aqueous solution of potassium bromide and the final dye obtained by recrystallization from alcohol. The minimum time required for the latter two steps is approximately from 3 to 4 hours, exclusive of the time required to cool the reaction mixture.

Theoretically, the trinuclear dyes should be capable of production by treating a 3-alkylrhodanine with an alkyl salt to effect quaternization of the hetero nitrogen atom thereof, and conversion of the thioketo group to a thioether group, the reaction of the thioether group with the reactive grouping of a cyclammonium salt and the linking of the intermediate so formed to a cyanine dye intermediate through the reactive methylene group of the thiazolone ring. In other words, it would seem that said dyes would form by carrying out, with the 3-alkylrhodanine per se, the last step of the conventional process and using the thus formed intermediate for reaction with another mol of a cyanine dye intermediate. Very surprisingly, however, it has been ascertained that 2-alkylthio-3-alkylrhodanines do not react with a cyclammonium salt to yield thiazolone cyanine dye intermediates.

Because of this, the art has become firmly convinced that in order to prepare trinuclear cyanine dyes of the rhodacarbocyanine type, it is necessary to treat a preformed merocyanine dye with alkyl salt to simultaneously effect quaternization of the nitrogen atom of the rhodanine ring system and the conversion of the thioketo group to a thioether group, and to react the resulting salt with a cyclammonium quaternary salt of the type used in the formation of cyanine dyes. The process steps involved in this preparation are not only tedious but time consuming.

It is an object of the present invention to provide an improved and simplified method for the preparation of trinuclear cyanine dyes.

A further object of the present invention is a method of producing trinuclear cyanine dyes containing a terminal 5- and 6-membered heterocyclic ring system.

A still further object is to provide a simpler method whereby trinuclear cyanine dyes in excellent yield are obtained.

Other objects and advantages will become apparent from the following description.

I have found that trinuclear cyanine dyes containing a terminal 5- and 6-membered heterocyclic ring are prepared in excellent yield and in readily purifiable form by condensing a 5- or 6-membered keto-heterocyclic compound containing a reactive acetanilido mono or polymethine group with a thiazolone cyanine dye salt while heating in the presence or absence of an alcohol as a solvent-diluent and in the presence of a tertiary base as a condensing agent on a steam bath or by heating the reaction mixture at reflux for a period of 5–20 minutes.

The dyes obtained by the foregoing procedure are characterized by the following general formula:

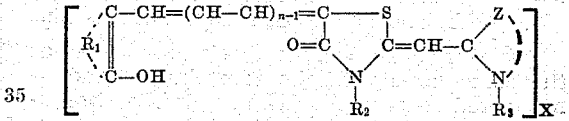

wherein $R_1$ represents the residue of a 5- or 6-membered heterocyclic nucleus, e. g., of a barbituric acid, a thiobarbituric acid, a rhodanine, an oxazoledione, a thiazolone, a pyrazolone, a hydantoin, a thiohydantoin, and the like, $n$ represents a positive odd integer of from 1 to 5, $R_2$ represents an alkyl, allyl, aryl, or aralkyl group, e. g., methyl, ethyl, propyl, phenyl, naphthyl, tolyl, benzyl, phenethyl and the like, $R_3$ represents an aliphatic, aryl, aralkyl or substituted groups of this type, e. g., methyl, ethyl, propyl, butyl, hydroxyethyl, ethoxyethyl, phenyl, tolyl, naphthyl, benzyl, phenethyl, menaphthyl, and the like, X represents an acid radical, e. g., chloride, bromide, iodide, or alkyl sulfate, alkyl p- toluenesulfonate or perchlorate, and Z represents the residue of a heterocyclic nitrogenous nucleus of the type used in cyanine dyes, e. g., oxazoles, thiazoles, selenazoles, and their polycyclic homologues, such as those of the benzene, naphthalene, acenaphthene, and anthracene series, pyridine, and its polycyclic homologues, such as quinoline and $\alpha$- and $\beta$-naphthaquinolines, perinaphthiazoles, indolenines, diazines, such as pyrimidines and quinazolines, diazoles (e. g., thio-$\beta$-$\beta'$-diazole), oxazolines, pyrrolines, thiazolines and selenazolines (the polycyclic compounds of these series being substituted if desired in the carbocyclic rings with one or more conventional groups, such as alkyl or aryl, as below, amino, hydroxy, alkoxy, i. e., methoxy, ethoxy, etc., and methylenedioxy groups, or by halogen atoms, i. e., chlorine, bromine, etc.).

The 5- and 6-membered heterocyclic intermediates derived from a rhodanine, a thiazolone, a hydantoin and the like, are characterized by the following general formula:

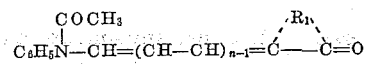

wherein $R_1$ and $n$ have the same significance as above.

As illustrative of compounds represented by this general formula, reference is made to:

4 - ($\gamma$ - acetanilidopropenylidene) - 1 - (2) - benzothiazolyl - 3 - methyl - 5 - pyrazolone
4 - acetanilidomethylene - 3 - methyl - 1 - phenyl - 5 - pyrazolone
4 - ($\gamma$ - acetanilidopropenylidene) - 3 - methyl - 1 - phenyl - 5 - pyrazolone
4 - acetanilidomethylene - 3 - methyl - 1 - (2) - pyridyl - 5 - pyrazolone
5 - acetanilidomethylene - 3 - allylrhodanine
5 - acetanilidopropenylidene - 3 - allylrhodanine
5 - acetanilidomethylene - 3 - phenylrhodanine
5 - acetanilidomethylene - 3 - ethylrhodanine
5 - acetanilidomethylene - 3 - ethyl - 2 - thio - 2,4(3,5) - oxazoledione
5 - ($\gamma$ - acetanilidopropenylidene) - 2 - diphenylamino - 4(5) - thiazolone
5 - ($\gamma$ - acetanilidopropenylidene) - 3 - ethyl - 2 - thio - 2,4(3,5) - oxazoledione
5 - ($\gamma$ - acetanilidopropenylidene) - 3 - ethyl - 1 - phenyl - 2 - thiohydantoin
5 - (5 - acetanilido - $\Delta$2,4 - pentadienylidene) - 3 - ethylrhodanine
5 - ($\gamma$ - acetanilidopropenylidene) - 2,4,6 - triketohexahydropyrimidine
5 - ($\gamma$ - acetanilidopropenylidene) - 2 - thio - 4,6 - diketohexahydropyrimidine and the like.

The thiazolone cyanine dye salts utilized as the coreactants with the foregoing 5- and 6-membered heterocyclic compounds are characterized by the following general formula:

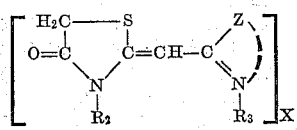

wherein $R_2$, $R_3$, X and Z have the same values as above, and are prepared according to the method described in my copending application Serial No. 786,814, filed November 18, 1947. In general, the method consists of condensing a substituted thioamide with an $\alpha$-halogen acetic acid. The compounds, in view of their keto-methylene configuration, undergo keto-enol tautomerism, i. e., the keto group enolizes to form a hydroxyl group.

As solvent-diluents employed in the preparation of the dyes of the present invention, the following alcohols may be employed: methyl, ethyl, propyl, isopropyl, butyl, benzyl, furfuryl alcohol and the like. Triethylamine, tributylamine and the like are representative of the tertiary bases which I may employ as the catalyst or condensing agent.

The following examples describe the preparation of some of the thiazolone cyanine dye intermediates illustrated by the foregoing formula. It is to be understood that any one of the thiazolone cyanine dye intermediates as illustrated in Examples 14 to 30 of my copending application Serial No. 786,814 may be condensed with any one of the 5- or 6-membered heterocyclic compounds containing a reactive acetanilido mono or polymethine group adjacent to a keto group.

*Example I*

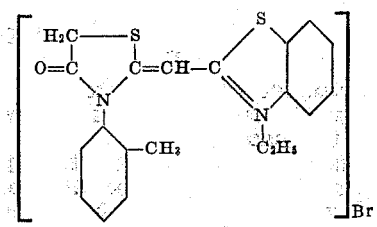

A mixture of 4 grams of $\alpha$-(3-ethylbenzothiazolylidene) thioacet-o-toluide and 4 grams of bromacetic acid was heated in 8 cc. of n-butanol for 10 minutes at 100° C., the solution becoming deep yellow in color. The mixture was cooled, stirred with ether, filtered, and washed with ether. The residue was heated at 80° C. to yield 3.9 grams of a thiazolone cyanine dye melting at 240–241° C.

*Example II*

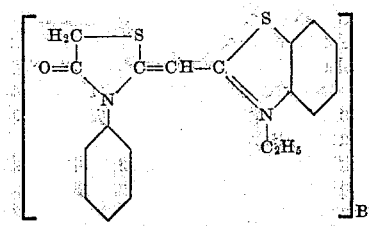

A mixture of 25 grams of $\alpha$-(3-ethylbenzothiazolylidene)-thioacetanilide and 25 grams of bromacetic acid was heated in 50 cc. of n-butanol as in Example I to yield 34.9 grams of a solid melting at 231–236° C. A 10 gram fraction of this was recrystallized from methanol to yield 7.7 grams of the final dye melting at 233–234° C.

*Example III*

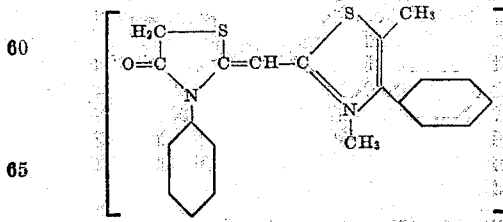

A mixture of 0.65 gram of $\alpha$-(3,5-dimethyl-4-phenylthiazolylidene)-thioacetanilide, 1.0 gram of bromacetic acid, and 2 cc. of acetic acid was heated at 115° C. for 1 hour. The product was precipitated with ether and subsequently washed with ether by decantation. The viscous product did not solidify and may be used directly in dye synthesis.

Example IV

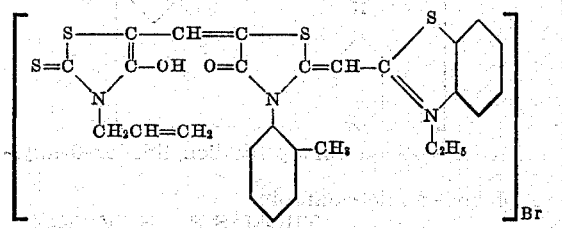

A mixture of 3.2 grams of 5-acetanilidomethylene-3-allylrhodanine, 4.2 grams of the thiazoline cyanine dye salt of Example I, 50 cc. of methanol and 0.5 cc. of triethylamine was heated at reflux for 5 minutes. The crude dye was boiled out with methanol and finally crystallized from pyridine. The absorption maximum of this dye in a methanol solution is 610 m$\mu$.

Example V

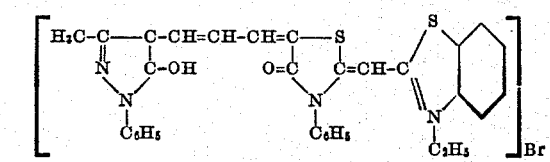

A mixture of 3.5 grams of 4-acetanilidoallylidene-1-phenyl-3-methyl-5-pyrazolone, 4.0 grams of the thiazolone cyanine dye salt of Example II, 50 cc. of methanol and 1 cc. of triethylamine was heated at reflux for 15 minutes. After cooling, the dye was separated and purified by boiling out with methanol.

Example VI

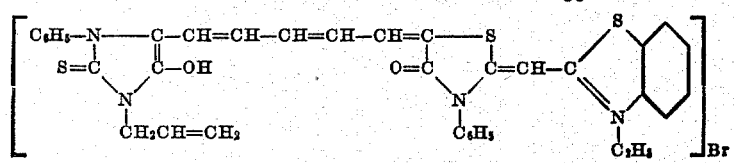

A mixture of 4.0 grams of 5-($\gamma$-acetanilidopentadienylidene)-3-allyl-1-phenyl-2-thiohydantoin, 4.0 grams of the thiazolone cyanine dye of Example II, 50 cc. of methanol, and 1 cc. of triethylamine was heated at reflux for 15 minutes. After cooling, the dye was separated and purified by boiling out with isopropanol. A solution of the dye in methanol has an absorption maximum at 621 m$\mu$. The sensitization range of a photographic emulsion is extended to 720 m$\mu$, with a maximum at 680 m$\mu$.

While the present invention has been described in considerable detail with reference to certain preferred procedures and materials employed, it is understood that the improved process of preparing trinuclear cyanine dyes is not limited thereto, and that numerous variations and modifications described in the foregoing specification may be made as, for example, the dyes which contain a thioketone group in the terminal 5-membered heterocyclic nitrogenous nucleus, as illustrated in Example IV, may be further treated with a quaternizing compound such as methyl iodide. The quaternized compound is then condensed under reflux conditions with a cyclammonium base or salt of the type used in cyanine dyes, such as 2-methyl-benzothiazole ethiodide and the like, having a reactive methyl group in the $\alpha$-position to the nitrogen atom thereof, in the presence of a basic condensing agent such as pyridine. In the first reaction (alkylation), the trinuclear dye is modified to the extent that the nitrogen atom in the 3 position of the oxazoledione hydantoin or rhodanine ring is quaternized and the sulfur atom in the 2 position is converted to a thioether group. In the second reaction (condensation), the alkylated trinuclear cyanine dye is condensed with a cyclammonium base or salt whereby symmetrical tetranuclear and new unsymmetrical tetranuclear cyanine dyes are obtained. Accordingly, the scope of my invention is to be limited solely by the appended claims.

I claim:

1. A process for the production of trinuclear cyanine dyestuffs comprising heating in the presence of a tertiary basic condensing agent a compound of the formula:

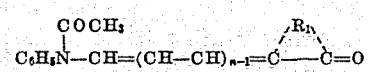

with a thiazolone cyanine dye salt characterized by the following formula:

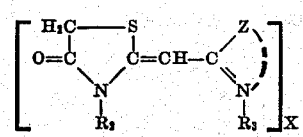

wherein $n$ represents a positive integer of from 1 to 3, $R_1$ represents the atoms necessary to complete a member selected from the class consisting of a 5-membered and 6-membered heterocyclic ring system, $R_2$ represents a member selected from the class consisting of alkyl, allyl, aryl, and aralkyl groups, $R_3$ represents a member selected from the class consisting of lower alkyl, lower hydroxyalkyl, lower alkoxyalkyl, aryl of the benzene and naphthalene series, and aralkyl groups, X represents an acid radical, and Z represents the atoms necessary to complete a heterocyclic nitrogenous nucleus of the type used in cyanine dyes.

2. The process for the production of a trinuclear cyanine dyestuff characterized by the following formula:

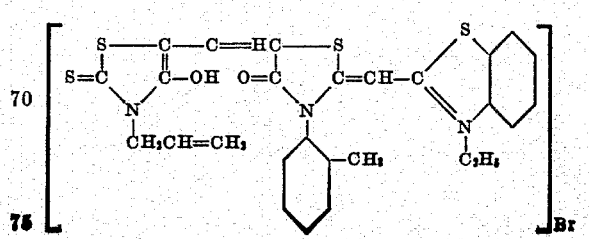

which comprises heating in the presence of a tertiary basic condensing agent a thioazolone cyanine dye of the formula:

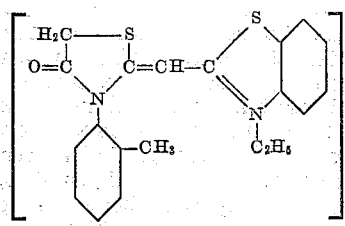

with 5-acetanilidomethylene-3-allylrhodanine.

3. The process for the production of a trinuclear cyanine dyestuff characterized by the following formula:

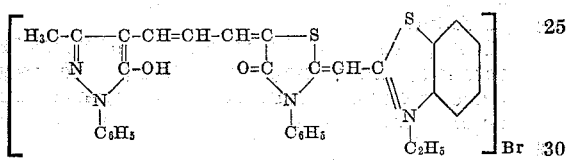

which comprises heating in the presence of a tertiary basic condensing agent a thiazolone cyanine dye of the formula:

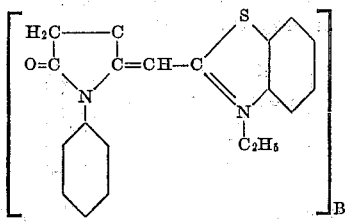

with 4-acetanilidopropenylidene-1-phenyl-3-methyl-5-pyrazolone.

4. The process for the production of a trinuclear cyanine dyestuff characterized by the following formula:

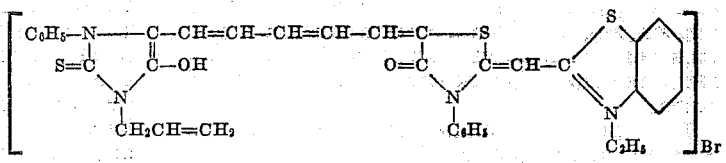

which comprises heating in the presence of a tertiary basic condensing agent a thiazolone cyanine dye of the formula:

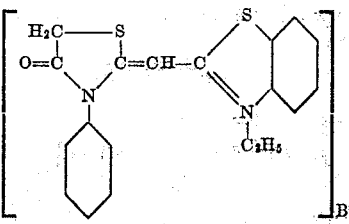

with 5-(γ-acetanilidopentadienylidene)-3-allyl-1-phenyl-2-thiohydantoin.

THOMAS R. THOMPSON.

No references cited.

Certificate of Correction

Patent No. 2,535,994 December 26, 1950

THOMAS R. THOMPSON

It is hereby certified that error appears in the printed specification of the above numbered patent requiring correction as follows:

Column 5, lines 36 to 38, Example V, for that portion of the formula reading

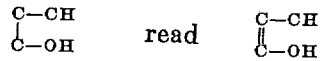

column 6, line 68, claim 2, for "—C=HC" read —CH=C;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*